(12) United States Patent
Vivanco

(10) Patent No.: US 12,219,409 B2
(45) Date of Patent: Feb. 4, 2025

(54) IDENTIFYING AERIAL CELLS OF A NETWORK BASED ON DIRECTION OF ARRIVAL (DOA)

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 301 days.

(21) Appl. No.: 17/960,465

(22) Filed: Oct. 5, 2022

(65) Prior Publication Data

US 2024/0121673 A1 Apr. 11, 2024

(51) Int. Cl.
*H04W 36/00* (2009.01)
*H04W 36/32* (2009.01)

(52) U.S. Cl.
CPC ... *H04W 36/0058* (2018.08); *H04W 36/0061* (2013.01); *H04W 36/322* (2023.05)

(58) Field of Classification Search
CPC ......... H04W 36/0058; H04W 36/0061; H04W 36/00835; H04W 36/008357; H04W 36/0085; H04W 36/083; H04W 36/22; H04W 36/322

See application file for complete search history.

(56) References Cited

U.S. PATENT DOCUMENTS

| | | | |
|---|---|---|---|
| 2004/0021604 A1* | 2/2004 | Marinier | H04W 64/00 342/465 |
| 2017/0142595 A1* | 5/2017 | Ljung | H04W 36/22 |
| 2023/0269635 A1* | 8/2023 | Xu | H04W 48/20 370/329 |

\* cited by examiner

*Primary Examiner* — Lester G Kincaid
*Assistant Examiner* — Dung L Lam
(74) *Attorney, Agent, or Firm* — Guntin & Gust, PLC; Kenneth S. Kwan

(57) ABSTRACT

Aspects of the subject disclosure may include, for example, deploying UAVs to a geographic area based on a need to offload traffic from a terrestrial base station, instructing the base station to enforce a UE served by the base station to determine a DoA of a received pilot signal emitted from each neighboring cell and to provide determined DoAs in a measurement report to the base station, obtaining the report from the base station, wherein the report includes DoA information for a plurality of neighboring cells, analyzing the DoA information to determine, for each neighboring cell of the plurality of neighboring cells, a probability of that neighboring cell being an aerial cell, resulting in determined probabilities, and controlling an ability of the base station to perform a handover of the UE to one or more of the plurality of neighboring cells based on the probabilities. Other embodiments are disclosed.

20 Claims, 7 Drawing Sheets

IDENTIFYING AERIAL CELLS OF A NETWORK BASED ON DIRECTION OF ARRIVAL (DOA)

FIELD OF THE DISCLOSURE

The subject disclosure relates to identifying aerial cells of a network based on direction of arrival (DoA).

BACKGROUND

Mobile networks (e.g., long term evolution (LTE), 5G, etc.) offer wide area, high speed, and secure wireless connectivity, which can be leveraged to enhance the control and safety of uncrewed aerial vehicle (UAV) or drone operations and enable beyond visual line-of-sight (LOS) use cases, such as deliveries, communications and media, inspection of critical infrastructure, surveillance, search-and-rescue operations, agriculture, and so on. As technology continues to advance, mobile networks will provide more efficient, tether-less broadband connectivity for wide-scale drone deployments. There are ongoing studies on the use of small cell-equipped UAVs in LTE and 5G network deployments to provide network coverage to terrestrial devices.

BRIEF DESCRIPTION OF THE DRAWINGS

Reference will now be made to the accompanying drawings, which are not necessarily drawn to scale, and wherein.

DETAILED DESCRIPTION

Figure 1:
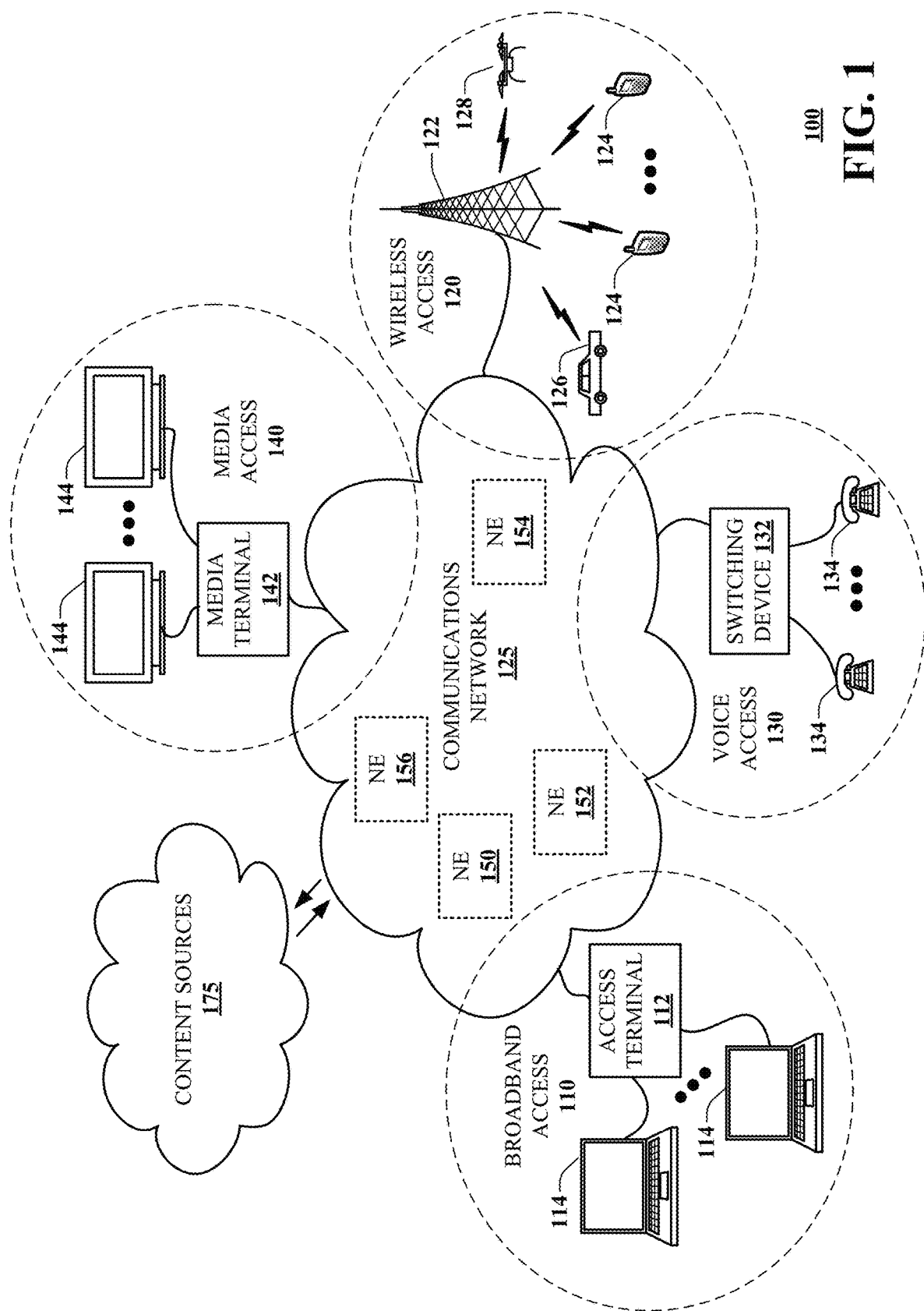
FIG. 1 is a block diagram illustrating an exemplary, non-limiting embodiment of a communications network in accordance with various aspects described herein.

A cell-on-wings (COW) is a cell site provided by a drone—e.g., an aerial eNodeB (eNB), gNodeB (gNB), or the like. Such an aerial base station may output or beam network coverage above the ground (from the sky) to a designated area on the ground surface. An aerial base station is particularly useful during high-capacity events or disaster situations, where a terrestrial base station or node may be congested or inoperable, or in extremely remote areas, where wired or wireless infrastructure might not be readily available (whether due to cost, zoning limitations, or otherwise).

An aerial base station or drone is easily deployable, and may include a small cell (e.g., a microcell, a picocell, or a femtocell) equipped with antennas and configured to communicate with a satellite or a terrestrial/macro node (or base station/cell) as a backhaul to facilitate communications (e.g., text messaging, voice calls, video calls, and data transmissions) for terrestrial UEs. Small cells are low-powered radio access nodes that have a coverage range that is smaller than that of macro cells. A small cell base station is a low cost, small, and simple unit that connects to a mobile network, either wirelessly or via wired means, and can be deployed for operations for several hours or more depending on the need. By virtue of its ability to fly to high altitudes (e.g., 300 feet or higher), an aerial base station can generally provide a larger coverage footprint than that of a terrestrial node, and thus can provide improved network capacity, data throughput, and coverage. Multiple aerial base stations can also be deployed to further expand the coverage footprint as needed. Integration of aerial base stations with terrestrial base stations provides a heterogeneous network that can facilitate seamless handoffs and increase overall user data capacity.

Assume that a mobile network operator deploys one or more aerial base stations to a particular geographic area to offload traffic from one or more terrestrial cells. In this case, it would be preferable for UEs in the area to choose an aerial cell for attachment rather than a congested terrestrial cell. However, a mobile network operator may generally assign physical cell identifiers (PCIs) to aerial cells that have already been assigned to other terrestrial cells. If automatic neighbor relations (ANR) is employed in the network, a UE may only leverage the PCI to identify a given cell, which may or may not be unique. It is thus essential for UEs located in such an area to differentiate aerial cell(s) from terrestrial cell(s) such that traffic can be offloaded from the terrestrial cell(s) accordingly.

The subject disclosure describes, among other things, illustrative embodiments of an aerial cell identification platform that is capable of leveraging direction of arrival (DoA) information to distinguish between aerial cell(s) and terrestrial cell(s) (e.g., from among a mixture of terrestrial and aerial cells).

Communication devices (i.e., terrestrial UEs and base stations) generally perform beamforming to achieve directional signal transmission and/or reception. In order for beamforming to enhance a signal's signal-to-noise ratio, a device (whether a UE or base station) generally determines the DoA of the incoming waveform. The DoA denotes the direction from which a propagating wave arrives at a point where a set of sensors (e.g., here, UE or base stations antennas) are typically located. In certain embodiments, a UE may, for purposes of beamforming, employ one or more DoA technique(s) to identify a signature or pattern (e.g., a direction or angle) of pilot signal(s) emitted by one or more cells—e.g., neighboring cell(s)—which allows for the recognition of a unique "fingerprint" for each cell. Since the signature or DoA of a waveform emitted from an aerial node positioned at a high altitude above the ground relative to a terrestrial UE will generally be different as compared to a signature or DoA of a waveform emitted from a terrestrial node positioned at a lower altitude above the ground relative to the terrestrial UE, the aerial cell identification platform can leverage DoA information to determine a likelihood or probability of given neighboring cell being a terrestrial or aerial cell, which can facilitate UE handovers for traffic offloading purposes.

In this way, the aerial cell identification platform may facilitate or promote offloading of traffic from terrestrial cell(s) to aerial cell(s) and thus reduce congestion in the terrestrial cell(s) and provide for improved network capacity and data throughput.

One or more aspects of the subject disclosure include a device, comprising a processing system including a processor, and a memory that stores executable instructions that, when executed by the processing system, facilitate performance of operations. The operations can include causing one or more uncrewed aerial vehicles (UAVs) to be deployed to a geographic area based on a determined need to offload traffic from a terrestrial base station. Further, the operations can include instructing the terrestrial base station to enforce a user equipment (UE) that is served by the terrestrial base station to determine a direction of arrival (DoA) of a received pilot signal emitted from each neighboring cell and to provide determined DoAs in a measurement report to the terrestrial base station. Further, the operations can include obtaining the measurement report from the terrestrial base station, wherein the measurement report includes DoA information for a plurality of neighboring cells. Further, the operations can include analyzing the DoA information to determine, for each neighboring cell of the plurality of neighboring cells, a probability of that neighboring cell being an aerial cell, resulting in determined probabilities. Further, the operations can include controlling an ability of the terrestrial base station to perform a handover of the UE to one or more of the plurality of neighboring cells based on the determined probabilities.

One or more aspects of the subject disclosure include a non-transitory machine-readable medium, comprising executable instructions that, when executed by a processing system of a mobile device including a processor, facilitate performance of operations. The operations can include receiving a command from a terrestrial base station to determine a direction of arrival (DoA) signature for each pilot signal received from each neighboring cell. Further, the operations can include, based on the command, calculating the DoA signature for each pilot signal received from each neighboring cell of a plurality of neighboring cells, resulting in a plurality of calculated DoA signatures. Further, the operations can include generating a measurement report for the plurality of neighboring cells that includes information regarding the plurality of calculated DoA signatures. Further, the operations can include transmitting the measurement report to the terrestrial base station, wherein the terrestrial base station provides the measurement report to an aerial cell identification platform that is configured to use the information to identify one or more suitable aerial cells from among the plurality of neighboring cells, and to control an ability of the terrestrial base station to perform handovers for the mobile device relative to the plurality of neighboring cells in accordance with any identified suitable aerial cells. Further, the operations can include coordinating with the terrestrial base station to effect a handover of the mobile device to a target neighboring cell, wherein the target neighboring cell is identified by the aerial cell identification platform as a suitable aerial cell based on the information.

One or more aspects of the subject disclosure include a method. The method can comprise obtaining, by a processing system of a terrestrial base station including a processor, an instruction from a core network system to enforce user equipment (UEs) that are served by the terrestrial base station to provide direction of arrival (DoA) information for received pilot signals emitted from neighboring cells. Further, the method can include, based on the obtaining, instructing, by the processing system, each of the UEs to determine respective DoA information. Further, the method can include, after the instructing, receiving, by the processing system, measurement reports from the UEs that each includes the respective DoA information. Further, the method can include transmitting, by the processing system, the measurement reports to the core network system to facilitate handover target determinations by the core network system, wherein the handover target determinations are made in accordance with the respective DoA information in the measurement reports. Further, the method can include receiving, by the processing system, commands from the core network system relating to the handover target determinations and facilitating, by the processing system, handovers for one or more of the UEs based on the commands.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, leveraging of DoA information to distinguish between aerial cell(s) and terrestrial cell(s) (e.g., from among a mixture of terrestrial and aerial cells). In particular, a communications network 125 is presented for providing broadband access 110 to a plurality of data terminals 114 via access terminal 112, wireless access 120 to a plurality of mobile devices 124, vehicle 126, and UAV 128 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
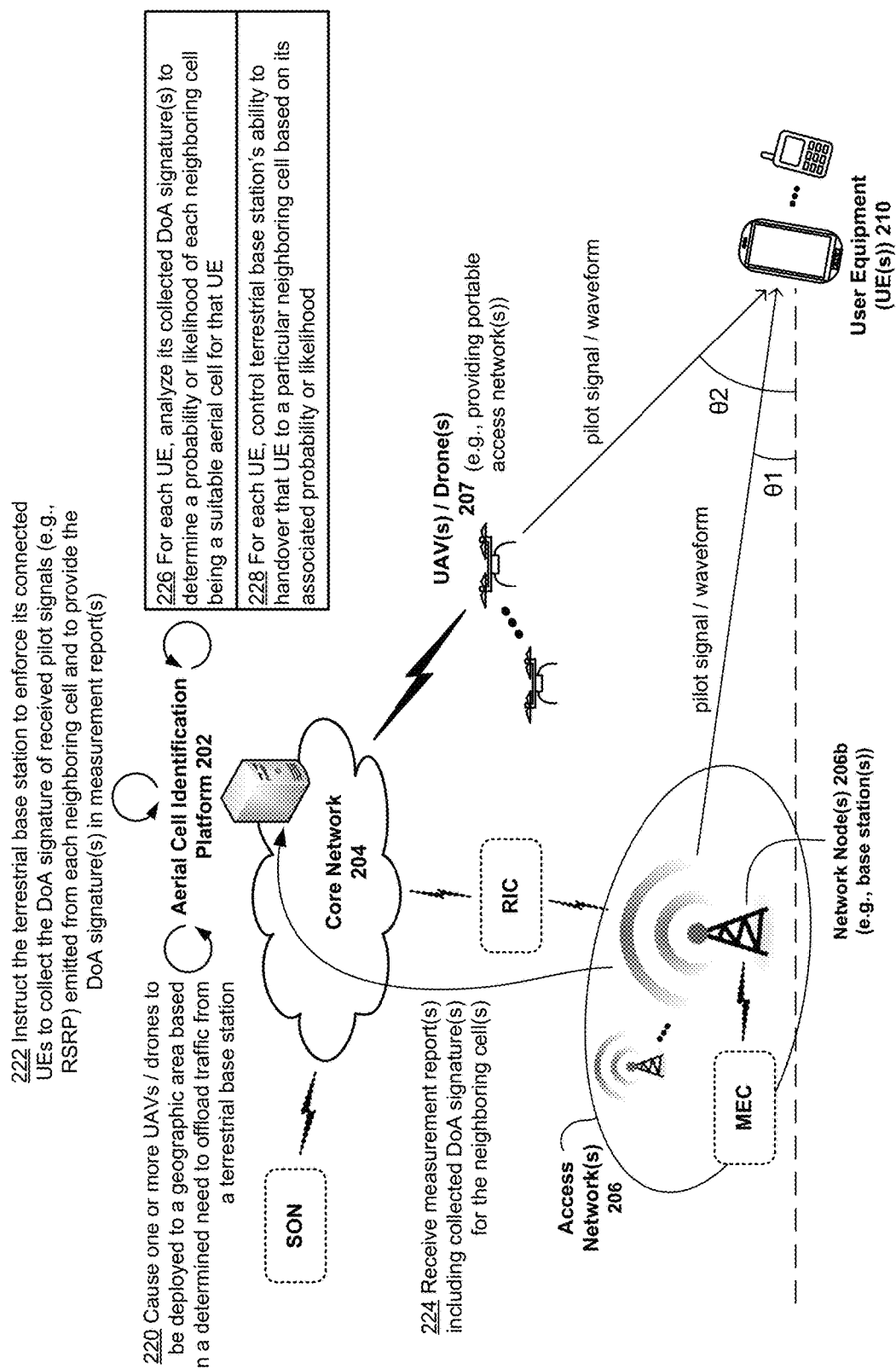
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a network system 200 functioning within, or operatively overlaid upon, the communications network 100 of FIG. 1 in accordance with various aspects described herein. As shown in FIG. 2A, the network system 200 may include a core network 204, one or more access networks 206, one or more UAVs/drones 207, and one or more UEs 210. In exemplary embodiments, the network system 200 may leverage DoA information to distinguish between aerial cell(s) and terrestrial cell(s) (e.g., from among a mixture of terrestrial and aerial cells).

The core network 204 may include network devices and/or systems that provide a variety of functions. In certain embodiments, the core network 204 may be implemented in a cloud architecture. Examples of functions provided by, or included, in the core network 204 include an access mobility function (AMF) configured to facilitate mobility management in a control plane of the network system 200 (including, for instance, providing UE mobility information associated with the access network(s) 206 and/or the UAVs/drones 207 to the core network 204), a user plane function (UPF) configured to provide access to a data network, such as a packet data network (PDN), in a user (or data) plane of the network system 200, a Unified Data Management (UDM) function, a Session Management Function (SMF), a policy control function (PCF), and/or the like. The core network 204 may be in communication with one or more other networks (e.g., one or more content delivery networks (CDNs)), one or more services, and/or one or more devices. In one or more embodiments, the core network 204 may include one or more devices implementing other functions, such as a master user database server device for network access management, a PDN gateway server device for facilitating access to a PDN, and/or the like. The core network 204 may include various physical/virtual resources, including server devices, virtual environments, databases, and so on.

In various embodiments, an access network 206 may include a wireless radio access network (RAN), a Wi-Fi network, and/or a wireline network. In exemplary embodiments, the access network 206 may be implemented in open source software (e.g., in an OpenAirinterface (OAI) wireless technology platform). The access network 206 may include network resources, such as one or more physical access resources and/or one or more virtual access resources. Physical access resources can include base station(s) 206b (e.g., one or more eNodeBs, one or more gNodeBs, or the like), one or more satellites, one or more Gigabyte Passive Optical Networks (GPONs) or related components (e.g., Optical Line Terminal(s) (OLT), Optical Network Unit(s) (ONU), etc.), and/or the like. A base station may employ any suitable radio access technology (RAT), such as 4G/LTE, 5G, 6G, or any higher generation RAT. One or more edge computing devices (e.g., multi-access edge computing (MEC) devices or the like) may also be included in or associated with the access network 206. Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the access network 206 may include any number/types of physical/virtual access resources and various types of heterogeneous cell configurations with various quantities of cells and/or types of cells.

In certain embodiments, the access network 206 may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool. In some embodiments, the access network 206 may include, or communicate with, a RAN intelligent controller (MC).

As shown in FIG. 2A, one or more UAVs or drones 207 may be deployed to provide network connectivity for the UE(s) 210. A drone 207 may include any personal or commercial aerial vehicle or device equipped with one or more types of devices or components for performing various actions. In certain embodiments, a drone 207 may include one or more radio equipment configured to function as a cellular relay (e.g., low-powered cellular radio access (or small cell) node(s)), one or more sensors (e.g., image sensor(s), infrared sensor(s), near infrared camera(s), radar system(s), light detection and ranging (LIDAR) system(s), biological sensor(s), temperature sensor(s), chemical sensor(s), humidity sensor(s), and/or the like) for capturing information/data in an environment of the drone 207, one or more mechanical limbs for physically manipulating external objects, and/or the like.

In various embodiments, a UAV/drone 207 may provide network connectivity by way of wireless "tethering" to (e.g., a base station or the like of) the access network 206 or a different access network (i.e., one that is not experiencing a traffic surge condition) and/or via a wired link (e.g., over a fiber connection) to a network device (e.g., edge computing device or the like) that has a backhaul connection to the core network 204. A UAV/drone 207 may additionally, or alternatively, communicate data (e.g., control data, user data, etc.) via the wireless tethering or wired link.

The system 200 can provide services to various types of UEs 210. Examples of UEs 210 include mobile devices 124, display and television devices, home and business networks, IoT devices, video and audio devices, and so on. A UE 210 may be equipped with one or more transmitter (Tx) devices and/or one or more receiver (Rx) devices configured to communicate with, and utilize network resources of, the system 200.

As shown in FIG. 2A, the network system 200 may also include an aerial cell identification platform 202. In exemplary embodiments, the aerial cell identification platform 202 may execute one or more algorithms that are configured to identify candidate target handover base stations/cells for UEs based on DoA information. In one or more embodiments, the algorithm(s) may be configured to "favor" offloading of traffic to aerial cells, as described in more detail below.

In various embodiments, the aerial cell identification platform 202 may be implemented in one or more devices included in the core network 204. For example, in a case where the core network 204 includes an evolved packet core (EPC), the aerial cell identification platform 202 may include, or may be implemented in, a mobility management entity (MME) gateway, a serving gateway (SGW), or another EPC system or device. As another example, in a case where the core network 204 includes a 5G core (5GC), the aerial cell identification platform 202 may include, or may be implemented in, an AMF or another 5GC system or device.

In various embodiments, the aerial cell identification platform 202 may be implemented in a centralized network hub or node device at, or proximate to, an edge of a network provider's overall network. In some embodiments, the aerial cell identification platform 202 can be implemented in a MEC device or devices. As the name/nomenclature implies, a MEC device may reside at a location that is at, or proximate, to an edge of the network system 200, which may be useful in reducing (e.g., minimizing) delays associated with provisioning of data or services to one or more (requesting) devices. In some embodiments, the aerial cell identification platform 202 may additionally, or alternatively, be implemented in a Self-Organizing Network (SON) or other similar network that provides automatic planning functions, configuration functions, optimization functions, diagnostic functions, and/or healing functions for a network. In some embodiments, the aerial cell identification platform 202 may additionally, or alternatively, be implemented in a RIC or other similar device or device(s) that leverage data analytics and machine learning and/or artificial intelligence to provide resource management capabilities, such as mobility management, admission control, and interference management, at an edge of a network.

As shown by reference number 220, the aerial cell identification platform 202 may cause one or more UAVs/drones 207 to be deployed to a geographic area based on a determined need to offload traffic from a terrestrial base station 206b. In various embodiments, a need to offload traffic from a terrestrial base station 206b may be determined in accordance with an identified or expected traffic surge or congestion condition. For instance, one or more core network functions (e.g., an AMF or the like) may obtain information from the terrestrial base station 206b regarding traffic conditions or otherwise predict (e.g., based on historical data) an upcoming traffic surge at the terrestrial base station 206b. For instance, the core network function may identify more than a threshold number of UEs 210 connecting to the terrestrial base station 206b, identify a decrease in available network capacity (e.g., to below a threshold value) in the terrestrial base station 206b, and/or the like. In various embodiments, the core network function may provide an indication of the traffic surge condition to the aerial cell identification platform 202, which may, in turn, cause (whether directly or via a UAV/drone deployment system (not shown)) the one or more UAVs/drones 207 to be deployed to the geographic area associated with the terrestrial base station 206b. In one or more embodiments, the aerial cell identification platform 202 may be configured to identify geographic area(s) associated with terrestrial cell(s) by comparing geolocations of the terrestrial cell(s) with those of aerial cell(s) together with (e.g., in accordance with or using) one or more propagation models.

Offloading traffic by an aerial cell may include establishing connections with some UEs located in the coverage area of the terrestrial base station 206b such that the terrestrial base station 206b is relieved from having to serve those UEs. In certain embodiments, the aerial cell identification platform 202 may facilitate deployment of the one or more UAVs/drones 207 based on one or more predefined policies or business logic/rules, such as policies on when or how drones may be deployed to alleviate traffic surge conditions, the types of drones (e.g., having certain capabilities relating to capacity, battery power, memory, etc.) that are suitable for deployment, how close the drones must be in relation to the terrestrial base station 206b in order to be considered for deployment, select types of traffic that must have surged in order for drone deployment to be considered, priority levels to set for certain types of traffic or services, and/or the like.

As shown by reference number 222, the aerial cell identification platform 202 may instruct the terrestrial base station 206b to enforce some or all of its connected UEs to collect the DoA signature of received pilot or reference signals (e.g., Reference Signal Received Power (RSRP) or other reference signal(s) in the cellular network) emitted from neighboring cells (e.g., each neighboring cell) and to provide the DoA signature(s) in measurement report(s) to the terrestrial base station 206b. In one or more embodiments, the terrestrial base station 206b may, based upon the instruction, request that (e.g., each of) its served UEs include DoA information for their detected pilot signals.

Generally speaking, there are two categories of DoA estimation algorithms that a UE may be equipped to employ, namely interferometric-based algorithms and correlation matrix-based algorithms. Interferometric DoA estimation exploits the phase offsets between consecutive array elements due to propagation delays. This type of estimation has a very low computational cost as compared to correlation matrix-based estimation. Multi-source DoA estimation is generally possible if the sources are not coherent. Even in a case of coherent sources, because of the cyclic nature of Quadrature Amplitude digital modulations, which are used in LTE-Advanced and possibly in 5G, the phase estimated for a signal at a certain antenna array element might be in fact more or less by multiples of 2n.

In any case, by virtue of the ability of a UAV/drone 207 to fly to and hover at high altitudes (e.g., 300 feet or higher), the DoA value (or angle) of its emitted waveform received at a UE 210 will be larger than that of a waveform emitted by the terrestrial base station 206b (see DoA $\theta_2$ relative to DoA $\theta_1$ in FIG. 2A). That is, a DoA signature corresponding to an aerial cell will generally differ from that of a terrestrial cell, since an aerial cell has a larger elevation angle as compared to a terrestrial cell. For instance, depending on the location of the UE 210 relative to the UAV/drone 207 and the terrestrial base station 206*b*, the value of θ2 may be 50 degrees, 60 degrees, or more, whereas the value of θ1 may be less than 50 degrees, such as only 40 degrees, 30 degrees, etc.

In exemplary embodiments, the aerial cell identification platform 202 may only require the terrestrial base station 206*b* to make the enforcement if one or more UAVs/drones 207 have been or are being deployed to offload traffic for the terrestrial base station 206*b*. That is, in a case where there is no need to offload traffic from the terrestrial base station 206*b*, the terrestrial base station 206*b* may or may not request its served UEs to include DoA information in measurement reports and the served UEs may or may not obtain and provide such DoA information.

As shown by reference number 224, the aerial cell identification platform 202 may receive measurement report(s) including collected DoA signature(s) for the neighboring cell(s) and, as shown by reference number 226, the aerial cell identification platform 202 may, for a given UE (e.g., for each UE), analyze its collected DoA signature(s) to determine, for a given neighboring cell (e.g., for each neighboring cell), a probability or likelihood of that neighboring cell being a (e.g., suitable) aerial cell for that UE. In exemplary embodiments, the aerial cell identification platform 202 may determine the probability or likelihood of a neighboring cell being an aerial cell by comparing its associated DoA with a threshold (e.g., 50 degrees, 55 degrees, 70 degrees, etc.). For instance, in a case where the DoA for the neighboring cell is greater than or equal to the threshold, the aerial cell identification platform 202 may determine that there is a high probability that the neighboring cell is an aerial cell. As another example, in a case where the DoA for the neighboring cell is less than the threshold, the aerial cell identification platform 202 may determine that there is a low probability that the neighboring cell is an aerial cell.

Below is an example measurement report provided by a UE to a terrestrial base station (or serving cell), identifying cell identifiers, signal quality levels (e.g., RSRP and/or another parameter), signal strength levels, and/or DoA signatures:

Cell.1→Signal.Strength=Strong|Signal.Quality= Excellent|DoA=75 degrees (and/or Very Large)
Cell.2→Signal.Strength=Low|Signal.Quality= Medium|DoA=80 degrees (and/or Very Large)
Cell.3→Signal.Strength=Strong|Signal.Quality= Excellent|DoA=45 degrees (and/or Medium)
Cell.4→Signal.Strength=Low|Signal.Quality= Medium|DoA=40 degrees (and/or Medium)

In various embodiments, the aerial cell identification platform 202 may extract the DoA values for the neighboring cells (e.g., 1 through 4 in the example measurement report above) and compare them with the aforementioned threshold. Alternatively, in a case where the UE is configured to perform the comparison internally and provide non-numerical, qualitative values that correspond to DoA ranges (e.g., "Very Large" for 50 degrees or higher, "Medium" for between 30 degrees and 50 degrees, etc.), the aerial cell identification platform 202 may simply rely on the qualitative values to determine the probability or likelihood. For instance, a "Very Large" DoA may indicate to the aerial cell identification platform 202 that the corresponding neighboring cell is likely to be an aerial cell. Thus, in the example measurement report above, the aerial cell identification platform 202 may infer that cells 1 and 2 are likely aerial cells.

As shown by reference number 228, the aerial cell identification platform 202 may, for a given UE (e.g., each UE), control the terrestrial base station 206*b*'s ability to handover that UE to one or more of its neighboring cells based on their associated probabilities or likelihoods. In exemplary embodiments, the aerial cell identification platform 202 may provide one or more commands to the terrestrial base station 206*b* that permit the terrestrial base station 206*b* to perform a handover of the UE 210 to particular neighboring cell(s) that are associated with a high probability or likelihood factor.

In certain embodiments, the aerial cell identification platform 202 may additionally consider the signal strength/quality associated with a neighboring cell when selecting that neighboring cell as a candidate for handover of the UE 210. For instance, in the example measurement report above, while cells 1 and 2 are likely aerial cells, the signal quality associated with cell 1 is higher than that associated with cell 2. In this case, the aerial cell identification platform 202 may choose cell 1 to be the permissible handover target for the UE 210. That is, the aerial cell identification platform 202 may restrict the terrestrial base station 206*b* from performing a handover of the UE 210 to cell 2 and may permit the terrestrial base station 206*b* to perform a handover of the UE 210 to cell 1. Alternatively, the aerial cell identification platform 202 may permit or enforce the terrestrial base station 206*b* to perform a handover of the UE 210 to either cell 1 or 2, in which case the terrestrial base station 206*b* may decide on which cell to perform the handover to. In some embodiments, the aerial cell identification platform 202 may compare the signal quality and signal strength of a pilot signal emitted by a given neighboring cell against respective thresholds as part of determining whether to permit or enforce the terrestrial base station 206*b* to perform a handover of the UE 210 to that neighboring cell—e.g., where signal quality and signal strength being greater than such respective thresholds may result in the aerial cell identification platform 202 enforcing the handover.

In some embodiments, the aerial cell identification platform 202 may leverage known locations of the UE 210 and at least some of its identified neighboring cells to further aid in determining whether such cells are aerial cells. For instance, the aerial cell identification platform 202 may obtain information regarding a location of the UE 210 (e.g., from data provided by the terrestrial base station 206*b*) as well as information regarding the respective locations associated with some or all of the cell identifiers identified in a measurement report. Here, the aerial cell identification platform 202 may compare the UE 210's location with (e.g., each of) the identified cell locations to ascertain whether a given cell is actually an aerial cell. This can avoid a terrestrial cell being erroneously identified as a suitable aerial cell in a case where the UE 210 is located very close to the corresponding terrestrial base station such that the DoA associated therewith is "Very Large" or above a threshold. In some embodiments, the aerial cell identification platform 202 may (e.g., only) perform the comparison or analysis of the UE and cell locations if the cell is first identified as likely being an aerial cell.

In some embodiments, a UE 210 may additionally, or alternatively, be equipped to leverage collected DoA information to distinguish aerial cells from terrestrial cells. For instance, a UE 210 may be configured to perform some or all of the above-described functionality relating to the comparison of DoAs to a threshold, the comparison of signal strengths/qualities, and/or the comparison of base station and UE locations to identify suitable aerial cell(s), and may include an indication of the identified suitable aerial cell(s) in the UE's measurement reports. In these embodiments, the terrestrial base station 206b and/or the aerial cell identification platform 202 may decide on whether and how to handover the UE 210 to a suitable aerial cell based at least in part on the suitable aerial cell(s) identified by the UE.

It is to be understood and appreciated that the quantity and arrangement of networks, platforms, systems, controllers, UEs, nodes, devices, and UAVs shown in FIG. 2A are provided as an example. In practice, there may be additional networks, platforms, systems, controllers, UEs, nodes, devices, and/or UAVs, fewer networks, platforms, systems, controllers, UEs, nodes, devices, and/or UAVs, different networks, platforms, systems, controllers, UEs, nodes, devices, and/or UAVs, or differently arranged networks, platforms, systems, controllers, UEs, nodes, devices, and/or UAVs than those shown in FIG. 2A. For example, the system 200 can include more or fewer networks, platforms, systems, controllers, UEs, nodes, devices, and/or UAVs, etc. In practice, therefore, there can be hundreds, thousands, millions, billions, etc. of such networks, platforms, systems, controllers, UEs, nodes, devices, and/or UAVs. In this way, example system 200 can coordinate, or operate in conjunction with, a set of networks, platforms, systems, controllers, UEs, nodes, devices, and/or UAVs and/or operate on data sets that cannot be managed manually or objectively by a human actor. Furthermore, two or more networks, platforms, systems, controllers, UEs, nodes, devices, or UAVs shown in FIG. 2A may be implemented within a single network, platform, system, controller, UE, node, device, or UAV, or a single network, platform, system, controller, UE, node, device, or UAV shown in FIG. 2A may be implemented as multiple networks, platforms, systems, controllers, UEs, nodes, devices, or UAVs. Additionally, or alternatively, a set of networks, platforms, systems, controllers, UEs, nodes, devices, or UAVs of the system 200 may perform one or more functions described as being performed by another set of networks, platforms, systems, controllers, UEs, nodes, devices, or UAVs of the system 200.

It is also to be understood and appreciated that, although FIG. 2A is described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Furthermore, in various embodiments, one or more of the actions described herein as being performed by the aerial cell identification platform 202 may additionally or alternatively be performed by a terrestrial base station 206b.

Figure 2B:
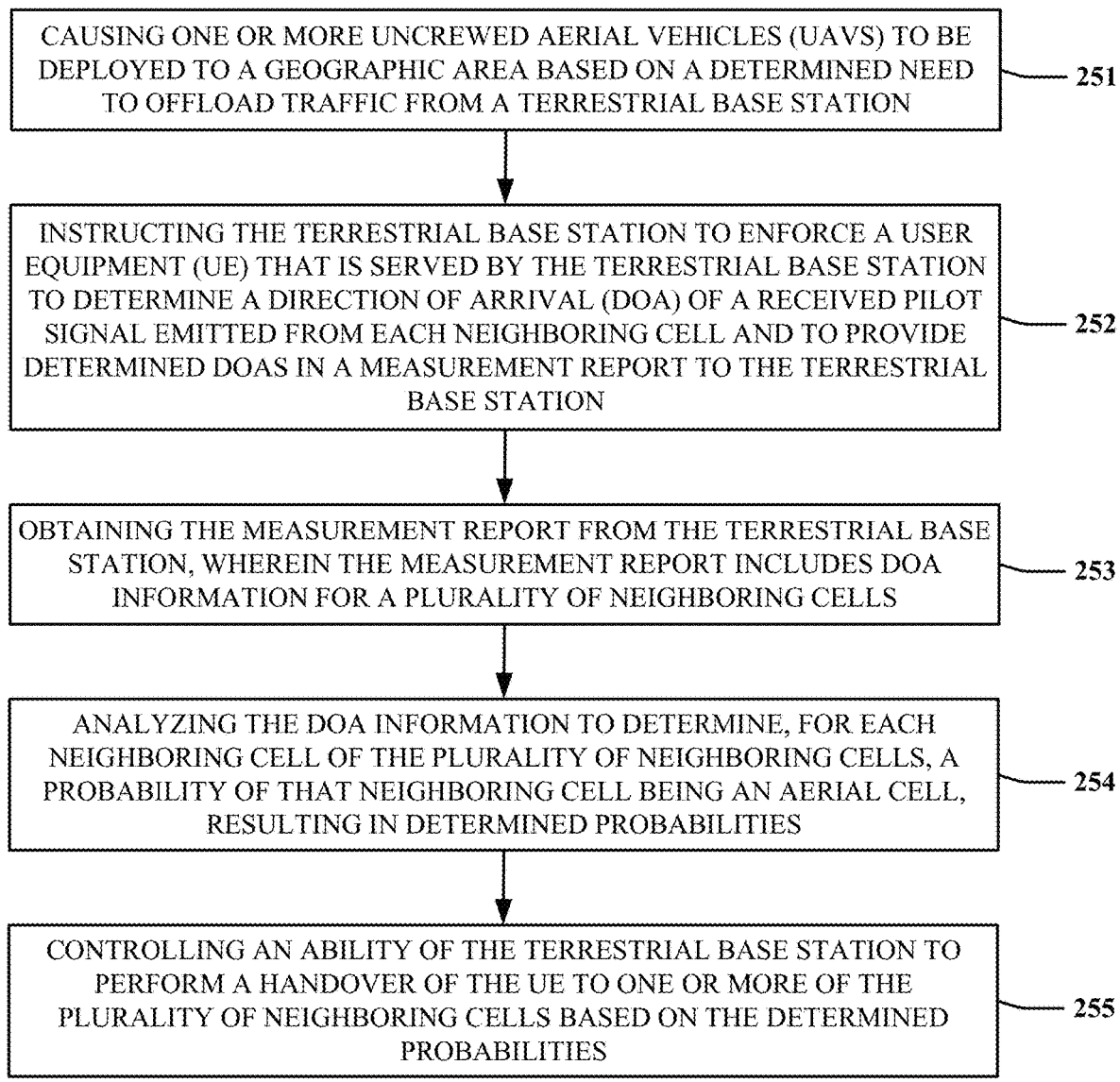
FIG. 2B depicts an illustrative embodiment of a method in accordance with various aspects described herein.

FIG. 2B depicts an illustrative embodiment of a method 250 in accordance with various aspects described herein. In some embodiments, one or more process blocks of FIG. 2B can be performed by an aerial cell identification platform, such as the aerial cell identification platform 202. In some embodiments, one or more process blocks of FIG. 2B may be performed by another device or a group of devices separate from or including the aerial cell identification platform, such as a terrestrial base station 206b, a UAV/drone 207, and/or a UE 210.

At 251, the method can include causing one or more uncrewed aerial vehicles (UAVs) to be deployed to a geographic area based on a determined need to offload traffic from a terrestrial base station. For example, the aerial cell identification platform 202 can, similar to that described above with respect to the system 200 of FIG. 2A, perform one or more operations that include causing one or more uncrewed aerial vehicles (UAVs) to be deployed to a geographic area based on a determined need to offload traffic from a terrestrial base station.

At 252, the method can include instructing the terrestrial base station to enforce a user equipment (UE) that is served by the terrestrial base station to determine a direction of arrival (DoA) of a received pilot signal emitted from each neighboring cell and to provide determined DoAs in a measurement report to the terrestrial base station. For example, the aerial cell identification platform 202 can, similar to that described above with respect to the system 200 of FIG. 2A, perform one or more operations that include instructing the terrestrial base station to enforce a user equipment (UE) that is served by the terrestrial base station to determine a direction of arrival (DoA) of a received pilot signal emitted from each neighboring cell and to provide determined DoAs in a measurement report to the terrestrial base station.

At 253, the method can include obtaining the measurement report from the terrestrial base station, wherein the measurement report includes DoA information for a plurality of neighboring cells. For example, the aerial cell identification platform 202 can, similar to that described above with respect to the system 200 of FIG. 2A, perform one or more operations that include obtaining the measurement report from the terrestrial base station, wherein the measurement report includes DoA information for a plurality of neighboring cells.

At 254, the method can include analyzing the DoA information to determine, for each neighboring cell of the plurality of neighboring cells, a probability of that neighboring cell being an aerial cell, resulting in determined probabilities. For example, the aerial cell identification platform 202 can, similar to that described above with respect to the system 200 of FIG. 2A, perform one or more operations that include analyzing the DoA information to determine, for each neighboring cell of the plurality of neighboring cells, a probability of that neighboring cell being an aerial cell, resulting in determined probabilities.

At 255, the method can include controlling an ability of the terrestrial base station to perform a handover of the UE to one or more of the plurality of neighboring cells based on the determined probabilities. For example, the aerial cell identification platform 202 can, similar to that described above with respect to the system 200 of FIG. 2A, perform one or more operations that include controlling an ability of the terrestrial base station to perform a handover of the UE to one or more of the plurality of neighboring cells based on the determined probabilities.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
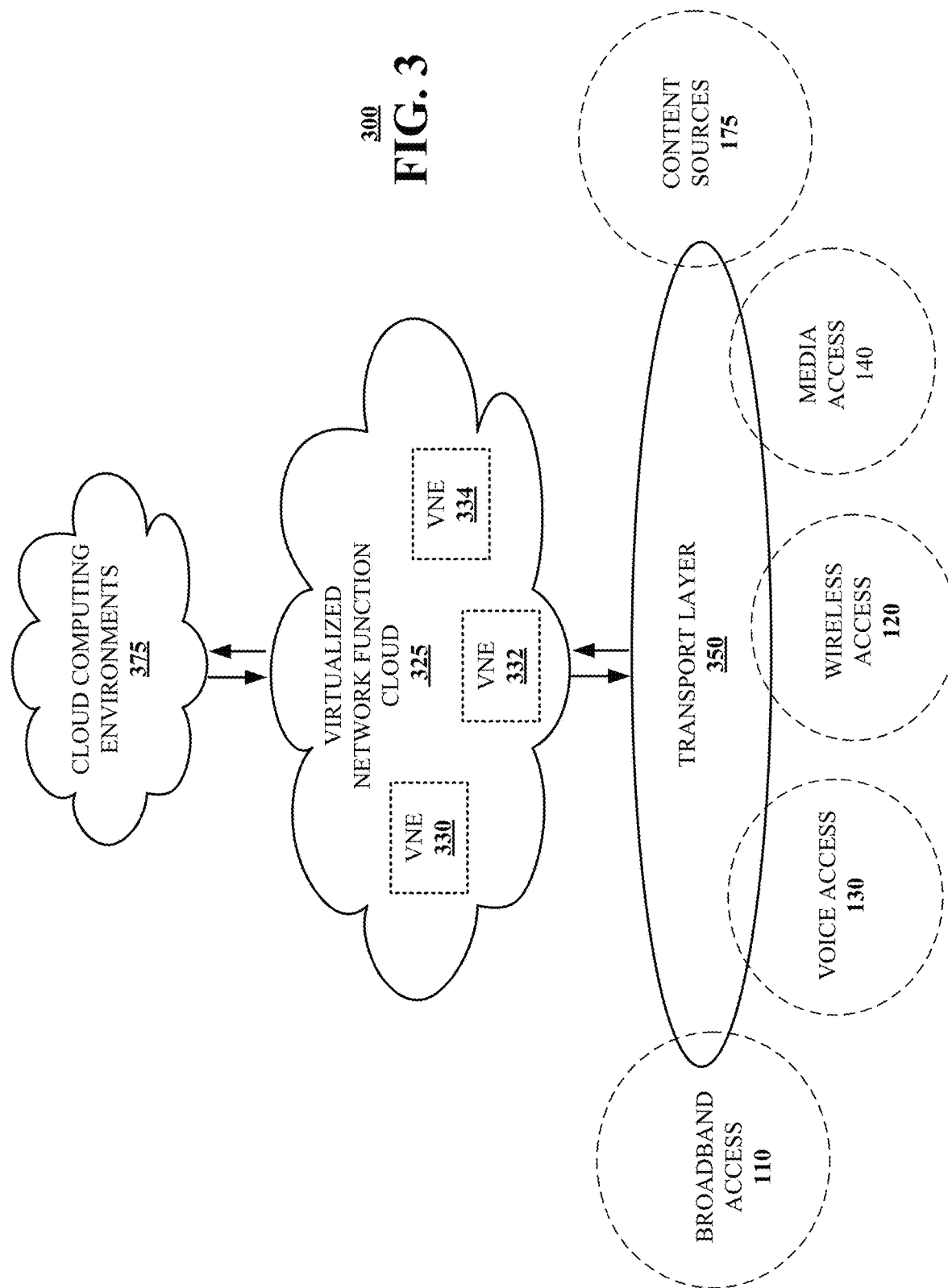
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and method 250 presented in FIGS. 1, 2A, and 2B. For example, virtualized communications network 300 can facilitate, in whole or in part, leveraging of DoA information to distinguish between aerial cell(s) and terrestrial cell(s) (e.g., from among a mixture of terrestrial and aerial cells).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
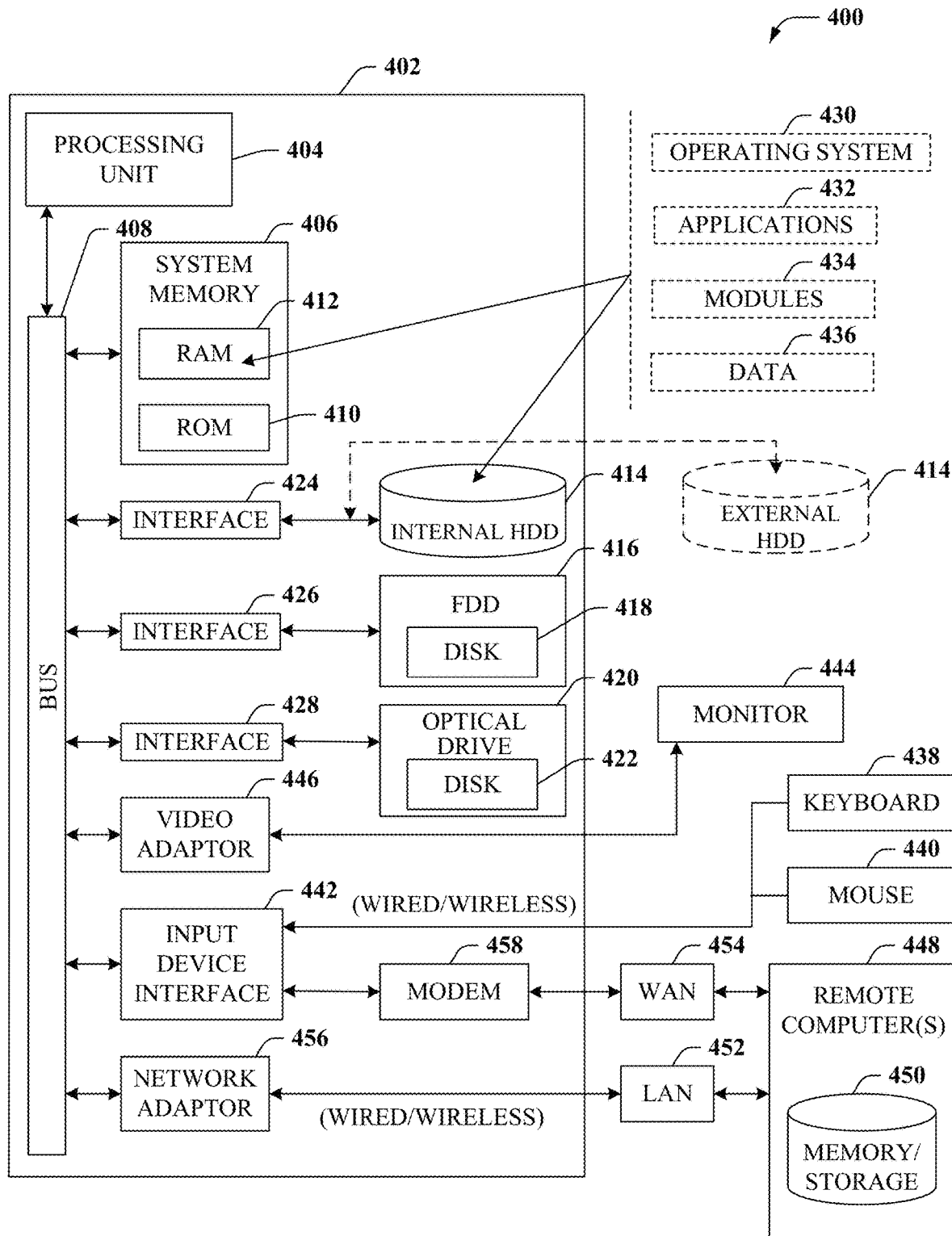
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, leveraging of DoA information to distinguish between aerial cell(s) and terrestrial cell(s) (e.g., from among a mixture of terrestrial and aerial cells).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
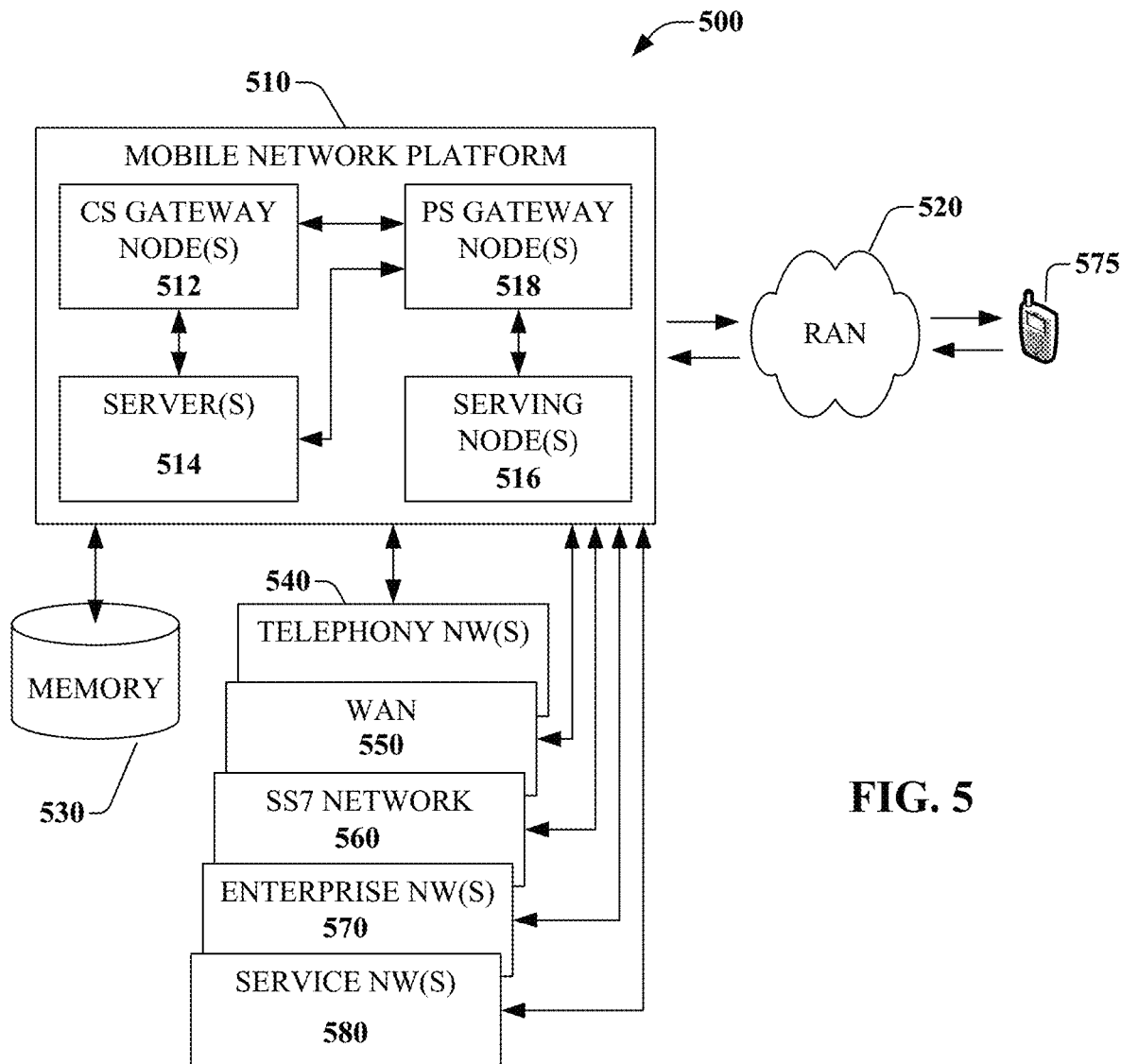
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, leveraging of DoA information to distinguish between aerial cell(s) and terrestrial cell(s) (e.g., from among a mixture of terrestrial and aerial cells). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
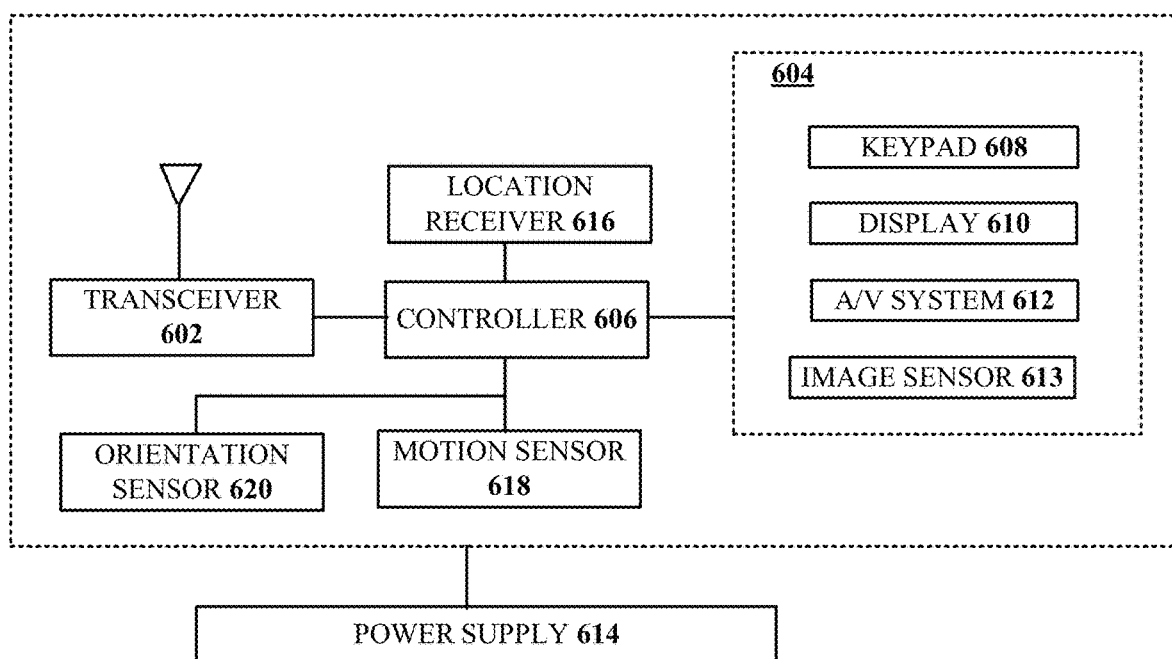
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, leveraging of DoA information to distinguish between aerial cell(s) and terrestrial cell(s) (e.g., from among a mixture of terrestrial and aerial cells).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   causing one or more uncrewed aerial vehicles (UAVs) to be deployed to a geographic area based on a determined need to offload traffic from a terrestrial base station;
   instructing the terrestrial base station to enforce a user equipment (UE) that is served by the terrestrial base station to determine a direction of arrival (DoA) of a received pilot signal emitted from each neighboring cell and to provide determined DoAs in a measurement report to the terrestrial base station;
   obtaining the measurement report from the terrestrial base station, wherein the measurement report includes DoA information for a plurality of neighboring cells;
   analyzing the DoA information to determine, for each neighboring cell of the plurality of neighboring cells, a probability of that neighboring cell being an aerial cell, resulting in determined probabilities; and
   controlling an ability of the terrestrial base station to perform a handover of the UE to one or more of the plurality of neighboring cells based on the determined probabilities.

2. The device of claim 1, wherein the DoA of each pilot signal comprises an angle of elevation of a terrestrial base station emitting that pilot signal with respect to the UE.

3. The device of claim 1, wherein the measurement report includes signal quality information of pilot signals associated with the plurality of neighboring cells, signal strength information of pilot signals associated with the plurality of neighboring cells, or a combination thereof.

4. The device of claim 3, wherein the controlling is further based on the signal quality information, the signal strength information, or the combination thereof.

5. The device of claim 1, wherein the analyzing of the DoA information comprises comparing each DoA value in the measurement report with a threshold.

6. The device of claim 5, wherein the controlling comprises:
enforcing the terrestrial base station to perform a handover of the UE to a particular neighboring cell of the plurality of neighboring cells if a DoA value corresponding to the particular neighboring cell is greater than or equal to the threshold and if signal quality and signal strength of a pilot signal emitted by the particular neighboring cell are greater than second and third thresholds, respectively; and
preventing the terrestrial base station from performing a handover of the UE to the particular neighboring cell if the DoA value corresponding to the particular neighboring cell is less than the threshold.

7. The device of claim 1, wherein the terrestrial base station is instructed to enforce the UE to determine DoAs of received pilot signals only if the one or more UAVs are deployed to the geographic area and not if no UAVs are deployed to the geographic area.

8. The device of claim 1, wherein the one or more UAVs are equipped with small cells capable of providing network connectivity for UEs.

9. The device of claim 1, wherein the operations further comprise instructing the terrestrial base station to enforce one or more additional UEs that are served by the terrestrial base station to determine DoAs of received pilot signals.

10. The device of claim 1, wherein the determined need is based on a detected traffic surge condition or a predicted traffic surge condition at the terrestrial base station.

11. A non-transitory machine-readable medium, comprising executable instructions that, when executed by a processing system of a mobile device including a processor, facilitate performance of operations, the operations comprising:
receiving a command from a terrestrial base station to determine a direction of arrival (DoA) signature for each pilot signal received from each neighboring cell;
based on the command, calculating the DoA signature for each pilot signal received from each neighboring cell of a plurality of neighboring cells, resulting in a plurality of calculated DoA signatures;
generating a measurement report for the plurality of neighboring cells that includes information regarding the plurality of calculated DoA signatures;
transmitting the measurement report to the terrestrial base station, wherein the terrestrial base station provides the measurement report to an aerial cell identification platform that is configured to use the information to identify one or more suitable aerial cells from among the plurality of neighboring cells, and to control an ability of the terrestrial base station to perform handovers for the mobile device relative to the plurality of neighboring cells in accordance with any identified suitable aerial cells; and
coordinating with the terrestrial base station to effect a handover of the mobile device to a target neighboring cell, wherein the target neighboring cell is identified by the aerial cell identification platform as a suitable aerial cell based on the information.

12. The non-transitory machine-readable medium of claim 11, wherein aerial cell identification platform is implemented in a core network.

13. The non-transitory machine-readable medium of claim 11, wherein the DoA signature comprises an angle of arrival.

14. The non-transitory machine-readable medium of claim 11, wherein the information regarding the plurality of calculated DoA signatures comprises, for each neighboring cell of the plurality of neighboring cells, a non-numerical value that corresponds to a DoA value range.

15. The non-transitory machine-readable medium of claim 11, wherein the measurement report includes signal quality information associated with pilot signals of the plurality of neighboring cells and signal strength information associated with pilot signals of the plurality of neighboring cells, and wherein the aerial cell identification platform is further configured to use the signal quality information and the signal strength information to identify the one or more suitable aerial cells.

16. A method, comprising:
obtaining, by a processing system of a terrestrial base station including a processor, an instruction from a core network system to enforce user equipment (UEs) that are served by the terrestrial base station to provide direction of arrival (DoA) information for received pilot signals emitted from neighboring cells;
based on the obtaining, instructing, by the processing system, each of the UEs to determine respective DoA information;
after the instructing, receiving, by the processing system, measurement reports from the UEs that each includes the respective DoA information;
transmitting, by the processing system, the measurement reports to the core network system to facilitate handover target determinations by the core network system, wherein the handover target determinations are made in accordance with the respective DoA information in the measurement reports; and
receiving, by the processing system, commands from the core network system relating to the handover target determinations and facilitating, by the processing system, handovers for one or more of the UEs based on the commands.

17. The method of claim 16, wherein the obtaining is in response to one or more small cell-equipped drones being deployed to form aerial cells for offloading traffic from the terrestrial base station.

18. The method of claim 16, wherein each of the measurement reports includes respective signal quality information associated with pilot signals of neighboring cells and respective signal strength information associated with pilot signals of neighboring cells, and wherein the core network system is configured to utilize the respective signal quality information and the respective signal strength information for the handover target determinations.

19. The method of claim 16, wherein the facilitating the handovers comprises permitting a first UE of the UEs to be handed over to a first neighboring cell that is identified by the core network system as a target aerial cell and restricting the first UE from being handed over to a second neighboring cell that is not identified by the core network system as a target aerial cell.

20. The method of claim 16, wherein the terrestrial base station comprises an eNodeB or a gNodeB.

\* \* \* \* \*